April 25, 1933.  H. G. DEWEY ET AL  1,905,446
FILM BACKING PAPER MAKING MACHINE
Filed Aug. 17, 1929  8 Sheets-Sheet 1
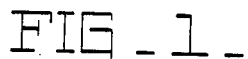
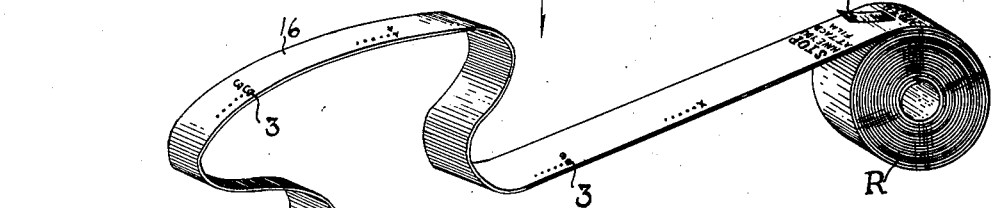
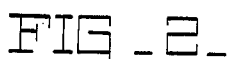
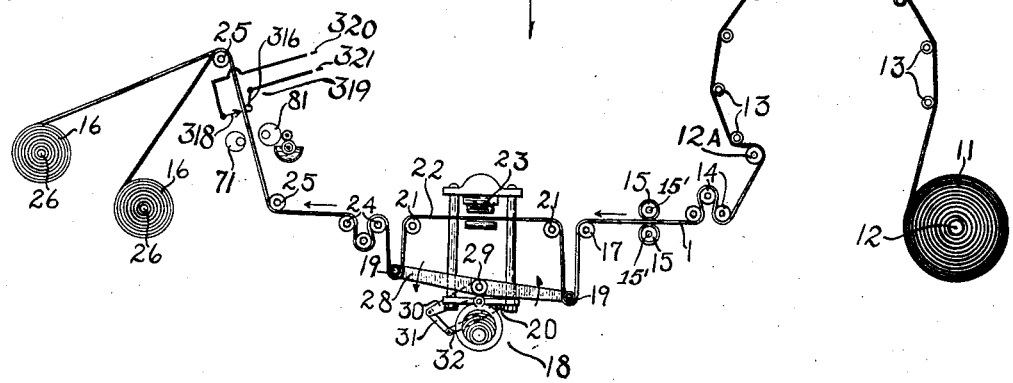
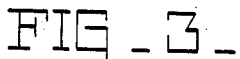
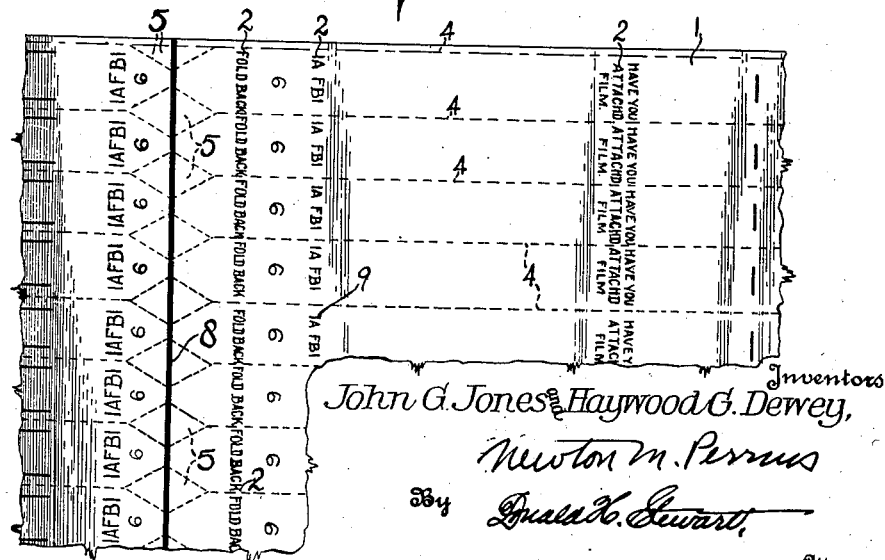
Inventors
John G. Jones and Haywood G. Dewey,
By Newton M. Perrus
Donald H. Stewart,
Attorneys April 25, 1933.  H. G. DEWEY ET AL  1,905,446
FILM BACKING PAPER MAKING MACHINE
Filed Aug. 17, 1929  8 Sheets-Sheet 2
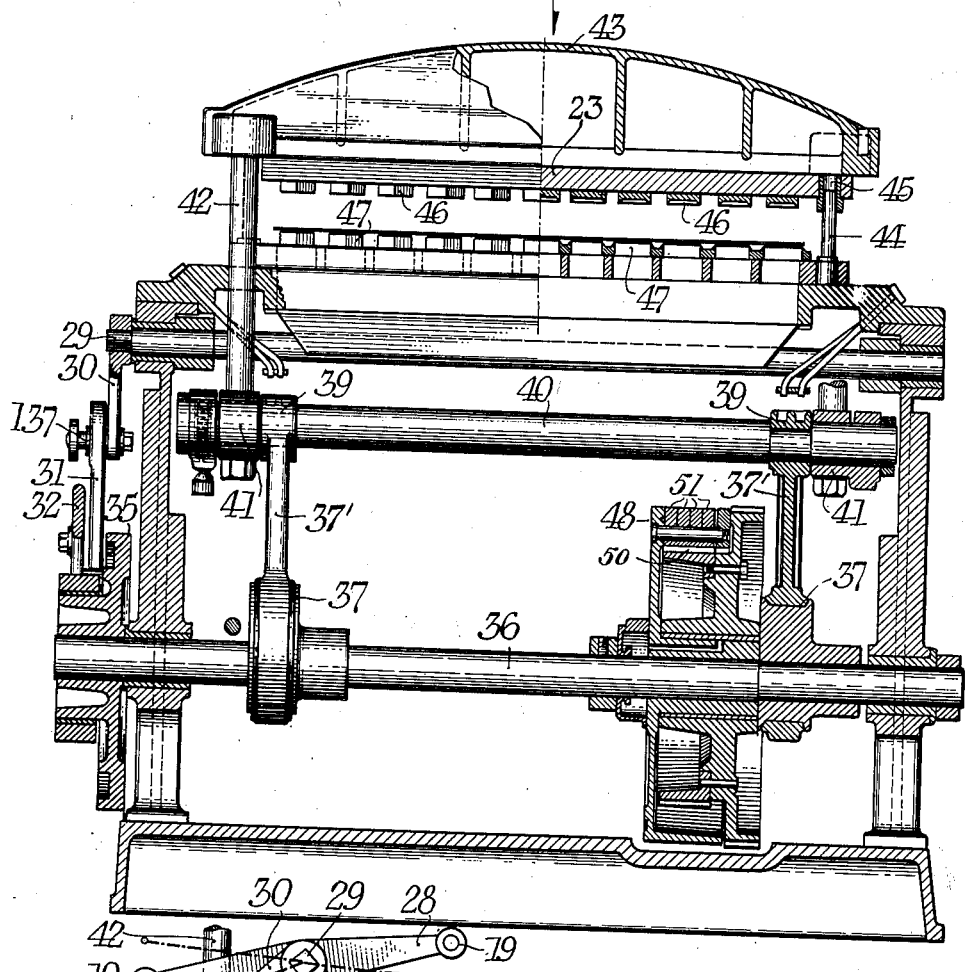
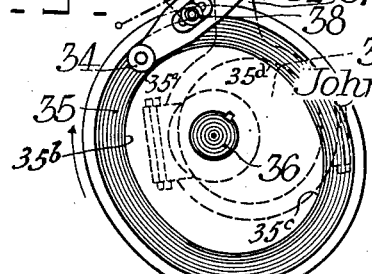
John G. Jones and Haywood G. Dewey,
INVENTORS,
BY Newton M Perrins
Donald H. Stewart,
ATTORNEYS.

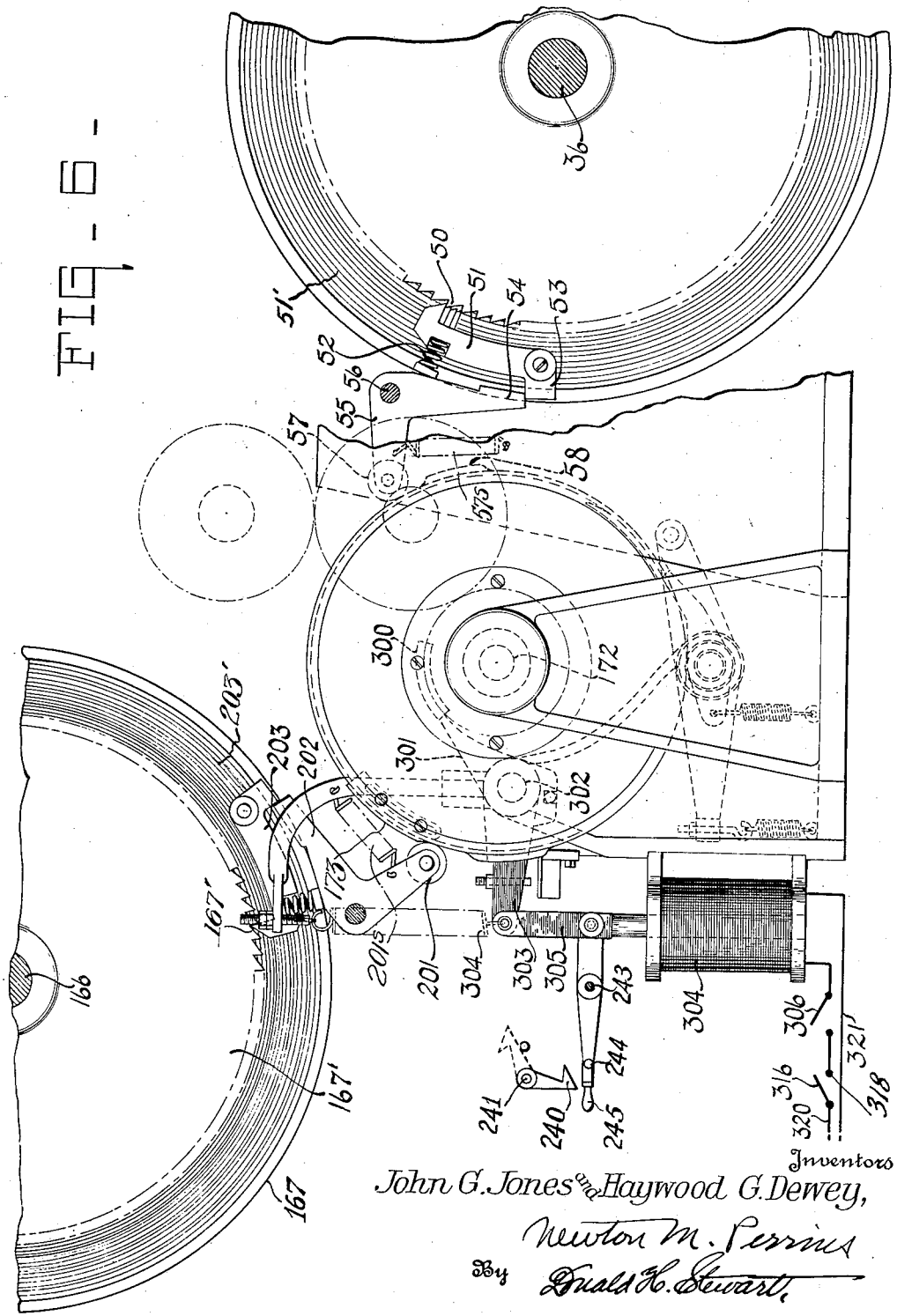

April 25, 1933.  H. G. DEWEY ET AL  1,905,446
FILM BACKING PAPER MAKING MACHINE
Filed Aug. 17, 1929  8 Sheets-Sheet 4
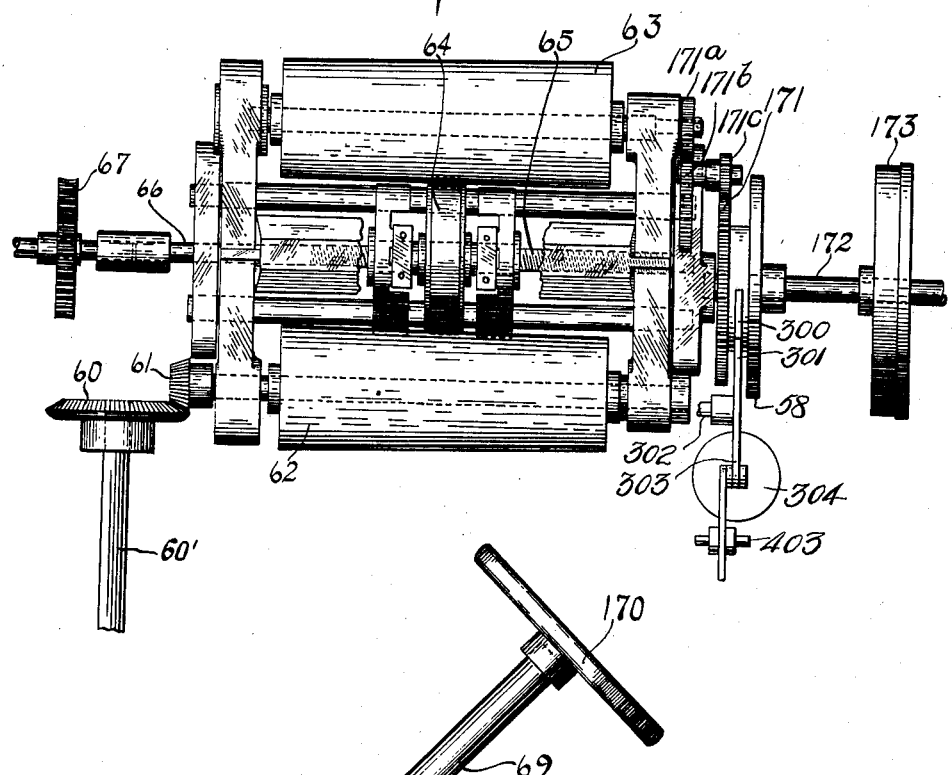
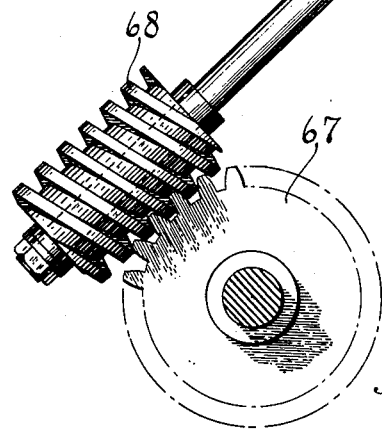
John G. Jones & Haywood G. Dewey, Inventors April 25, 1933.  H. G. DEWEY ET AL  1,905,446
FILM BACKING PAPER MAKING MACHINE
Filed Aug. 17, 1929  8 Sheets-Sheet 5
FIG_9_
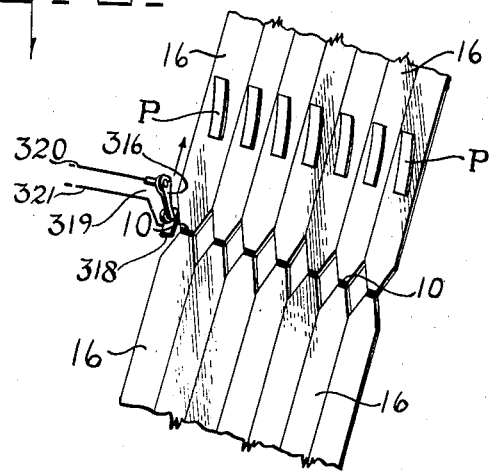
FIG_10_
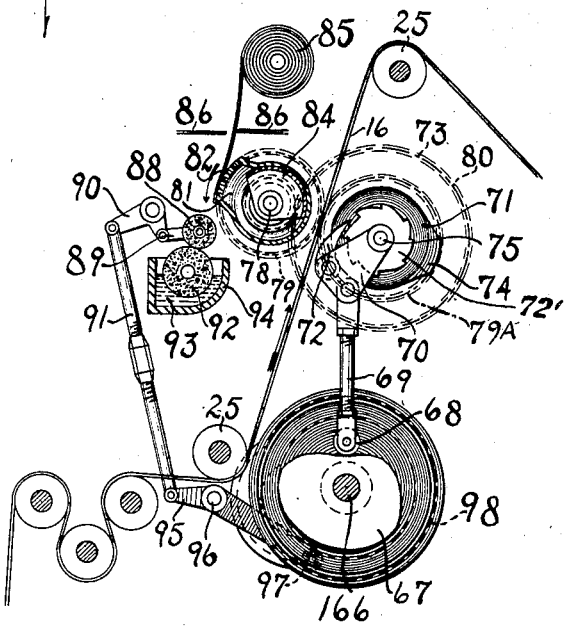
Inventors
John G. Jones & Haywood G. Dewey,
By Newton M. Perrins
Donald H. Stewart
Attorneys

FIG. 11

April 25, 1933.    H. G. DEWEY ET AL    1,905,446
FILM BACKING PAPER MAKING MACHINE
Filed Aug. 17, 1929    8 Sheets-Sheet 7

Inventors
John G. Jones & Haywood G. Dewey,
By
Attorneys

April 25, 1933.   H. G. DEWEY ET AL   1,905,446
FILM BACKING PAPER MAKING MACHINE
Filed Aug. 17, 1929   8 Sheets-Sheet 8
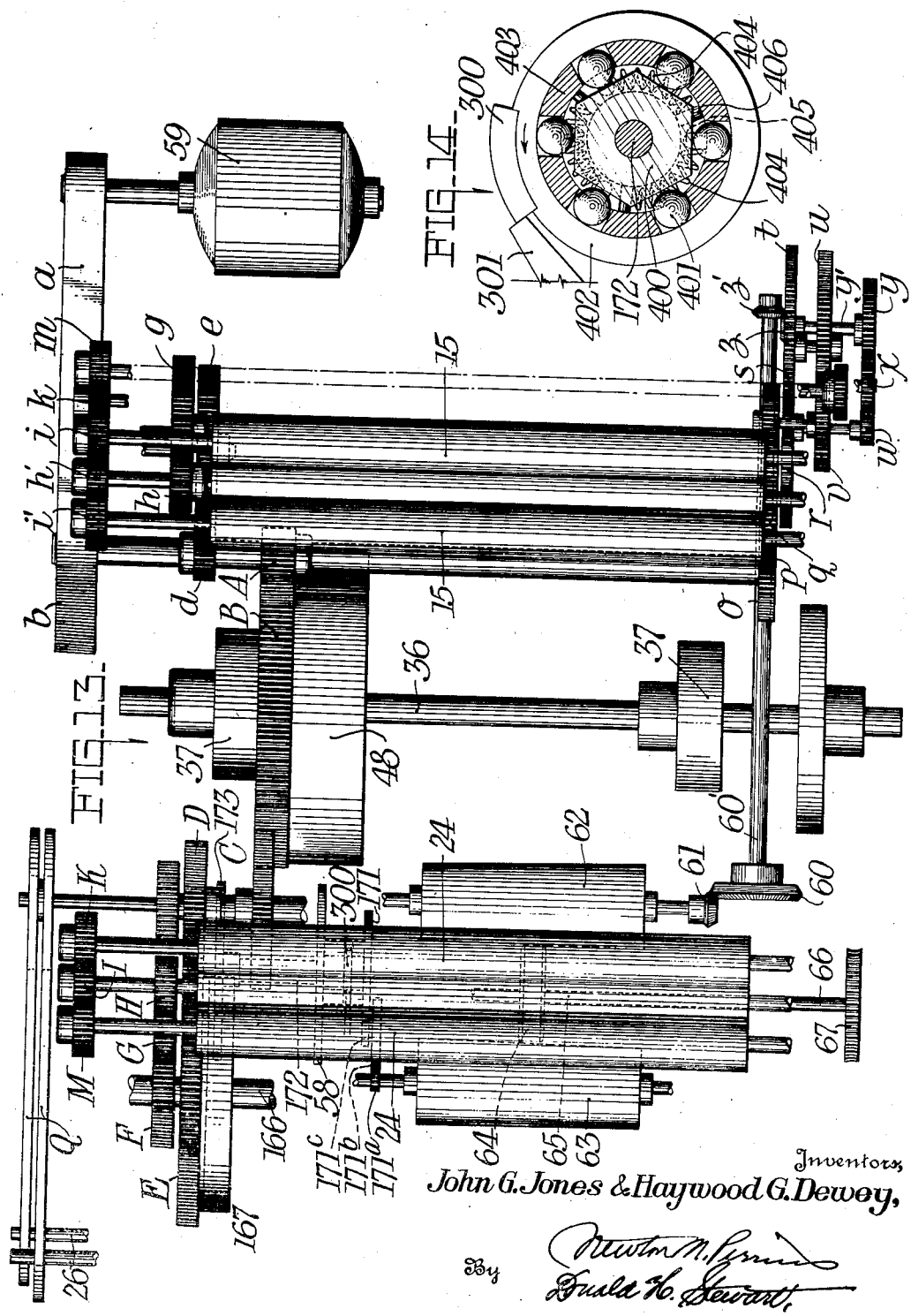
Inventors
John G. Jones & Haywood G. Dewey,
By
Attorneys.

Patented Apr. 25, 1933

1,905,446

UNITED STATES PATENT OFFICE

HAYWOOD G. DEWEY AND JOHN G. JONES, OF ROCHESTER, NEW YORK, ASSIGNORS TO EASTMAN KODAK COMPANY, OF ROCHESTER, NEW YORK, A CORPORATION OF NEW YORK

FILM BACKING PAPER MAKING MACHINE

Application filed August 17, 1929. Serial No. 386,692.

This invention relates to machines for preparing strips of film backing paper complete from previously printed wide sheets, with the necessary printing and pasters in the proper position. Such paper strips are later wound in convolutions upon a spool with film to make what is usually known as a film cartridge. One object of our invention is to provide a machine which will cut out the film backing paper in the desired width and with which the length of the strips may be kept in registration with the printing of the backing papers, which may vary due to shrinkage or expansion. Another object of our invention is to provide a machine upon which rolls or coils of backing paper in a continuous strip and with the attached pasters can be made. Another object of our invention is to provide a machine in which the mechanism for shaping the ends of the paper strips can be made to function at different intervals of time, so that different types of backing papers can be made for different film cartridges. Another object of our invention is to provide a compensating mechanism which will bring the paper to rest momentarily under the shaper and also allow of continuous motion through other portions of the machine. Another object of our invention is to provide a backing paper strip making machine with a simple regulating device which can be operated during the operation of the machine for compensating for irregularities in the printing of the strip material and other objects will appear from the following specifications, the novel features being particularly pointed out in the claims at the end thereof.

It has been customary to provide film backing papers by printing a wide strip of paper with the various data which is necessary and then to slit up the wide sheet into a series of narrow strips. After this is done the ends of the strips are shaped and chopped apart by hand and pasters may be applied in a separate operation. This is a difficult operation to perform rapidly because so far as we are aware no machine has ever been made which can compensate for the variable expansion or contraction of the paper strip from which the separate film backing papers are made.

As can readily be seen, if the machine is set for making the ends of the strips at a predetermined interval and the paper has expanded or contracted, after a series of chops are made, the chopping operation will be performed at the wrong place, and the printing on the film backing papers will not lie in the correct position with respect to the film which is later attached to the paper.

Obviously expansion or contraction of the paper varies with the grade and type paper used. With the paper generally used for film backing papers, shrinkage is the chief difficulty encountered, and this is frequently as great as 1/8 of an inch to a foot. Still another variable is in the printing which, due to slippage of the paper in the printing machine, may easily vary considerably plus or minus, so the accumulated errors would rapidly pile up unless cared for while the backing paper making machine is operating.

It is to overcome these and other difficulties that the present machine has been particularly designed.

Coming now to the drawings wherein like reference characters denote like parts throughout:

Fig. 1 is a perspective view of a film backing paper roll which may be made complete except for the printing on a machine constructed in accordance with our invention;

Fig. 2 is a diagrammatic view to illustrate the most important features of a film backing paper making machine constructed in accordance with embodying a preferred form of our invention;

Fig. 3 is a plan view of a portion of a wide sheet of paper printed for film backing paper and having illustrated by broken lines the portions to be cut from the strip to make the individual rolls;

Fig. 4 is a sectional view through the shaper which forms a part of our preferred machine, this shaper forming the end portions of the film backing papers after the wide sheets is slit up into a plurality of narrow strips.

Fig. 5 is a fragmentary side elevation partially in section showing the shaper operating mechanism and the mechanism for operating the compensator;

Fig. 6 is a side elevation partially in section of the timing shaft, clutch trips and a part of the regulating mechanism used with our machine;

Fig. 7 is a top plan view partially broken away showing the power drive and speed control used on our machine;

Fig. 8 is a side elevation of the speed controlling mechanism which may be regulated by an operator while the machine is running;

Fig. 9 is a fragmentary perspective view of a portion of a slotted and shaped sheet showing a number of completed film backing paper strips with their pasters in the proper position;

Fig. 10 is a side elevation of the more important parts of the paster applying mechanism;

Figure 11:
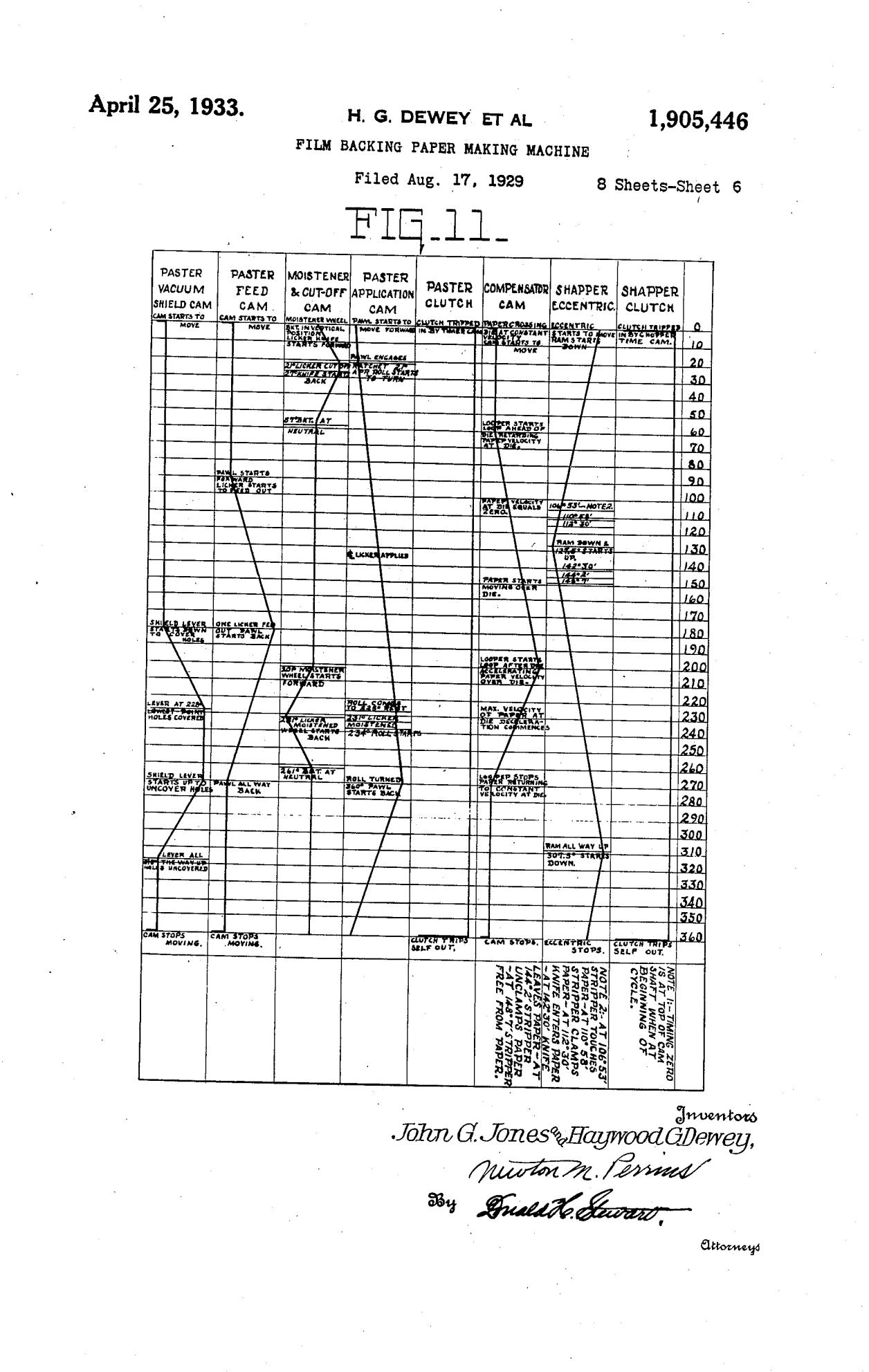

Fig. 11 is a timing chart illustrating the relative movement of the various parts;

Fig. 13 is a top plan view of the mechanism shown in Fig. 12; and

Fig. 14 is a fragmentary detail of a portion of clutch 300.

Figure 12:
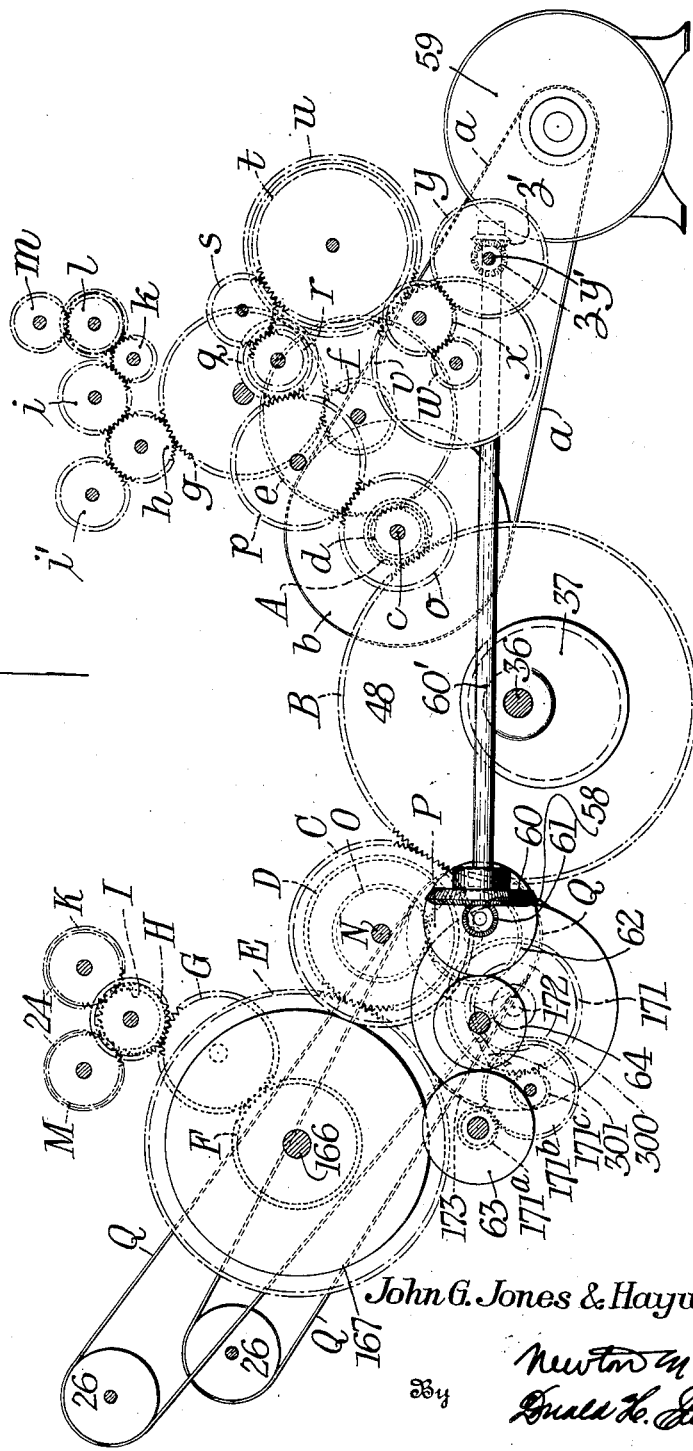
Fig. 12 is a side elevation of the power drive shafts and gearing, the frame being omitted for the sake of clearness.

As shown in Fig. 1, film backing paper is preferably in the form of long strips with the ends of the strips connected so that the roll R can be placed in an automatic or in a semi-automatic film spooling machine which is used for unwinding that film upon a spool to make a complete film cartridge. An automatic film spooling machine is shown in our Patent 1,532,753, issued April 7, 1925 in the name of J. G. Jones and H. G. Dewey, and a semi-automatic film spooling machine is shown in Patent 1,560,167, issued Nov. 3, 1925, in the name of John G. Jones. The backing papers made by our present machine are particularly useful in connection with the above mentioned spooling machine, although of course such rolls, R, are equally suitable for making up roll film cartridges by hand.

In Fig. 2 there is shown a diagrammatic view of the present machine. There is a wide sheet of paper 1 which has been previously printed with all of the data required for film backing paper, 2, and these sheets of paper are stored until ready for use. The paper, as indicated in Fig. 3, in passing through our machine may have the edge cut off and will be slitted as indicated by the lines 4. Diamond shaped portions 5 may be cut out to form the tapered ends for the separate film bands but the paper between the diamond shaped portions will not be cut apart so that there will result long rolls of paper properly shaped as indicated at Fig. 1.

The wide backing paper sheet 1 is wound into coils 11 which are mounted on a spindle 12. The backing paper sheet 1 is drawn over a "turtle back", the turtle back including a plurality of guide rolls 13 which permit the paper sheet 1 to be drawn taut and to run smoothly over the driven rolls 14. These rolls guide the paper strip so that it is in a condition to be slitted.

The slitting operation is performed in a known manner by means of a plurality of circular knives 15 mounted in axial spaced relation along the shafts 15'. The slitting knives 15 on one shaft 15' overlap and cooperate with the knives 15 on the other shaft 15' so that the wide sheet of backing paper 1 is cut longitudinally into a plurality of long strips 16 as the paper is moved through the machine.

After the wide backing paper sheet 1 has been slitted, the resultant strips 16 pass over the guide rollers 17 and to a compensator which is designated broadly at 18 and which consists of a mechanism for momentarily holding a portion of the moving strips stationary so that the shaping operation can take place.

The compensating mechanism comprises a pair of rollers 19 which are momentarily moved by mechanism 20 at a speed proportional to the speed of travel of the paper, so the portions 22 part of the paper strips 16 which lie between the guide rolls 21 will be momentarily held stationary, while the shaper 23 punches out the diamond shaped portions 5 of the strip.

After passing from the compensator, the paper strips pass through the driven rollers 24 and around the guide rolls 25 under tension created by the over driven wind ups 26. Between rollers 25—25 there is a paster applying station indicated in Fig. 2 by the eccentric 71 and suction roll 81, these being operated in the proper timed relation to apply the pasters P in the proper position on the film backing paper strips.

After moving from the rollers 25, the separate paper strips 16 are coiled upon shafts 26 to form the rolls R shown in Fig. 1. Rolls 14 and 24 are power driven from motor 59 as fully set forth in the following paragraphs.

Tension is applied to the strip material at 12 and 12A and the wind ups 26 are driven frictionally at a slightly greater speed than the speed of the strip material, as is also fully described below.

Power is furnished by a motor 59 through a belt $a$ to a pulley $b$ carried by the shaft $c$. From this shaft there are three main series of gear trains.

One gear train composed of gears $d$, $e$, $f$, $g$, $h$, $i$, $k$, $l$ and $m$ transmits power to the drive rolls 14 and to the shafts 15' of the slitting knives 15.

Another gear train composed of gears A, B, C, D, E, F, G, H, I, K and M conduct power to the driven rollers 24 and in this gear train the gears C and D are keyed to a shaft N from which the gears O and P drive the take-up spindles 26 through suitable driving connections such as the chain drives Q.

Still another gear train is composed of gear *o* mounted to turn on shaft *c* which meshes with gear *p* and drives through the following gears *q, r, s, t, u, v, w, x, y* and *z*, a shaft 60' to which a beveled gear *z'* is attached, gears *z* and *z'* both being beveled gears.

Shaft 60' carries on its opposite end a beveled gear 60 which meshes with a beveled gear 61 to drive the driven cone 62. Through the driven cone 62 friction wheel 64 and cone 63, power is transmitted to the shaft 172, through a clutch 300 by means of a gearing consisting of gears 171*a*, 171*b*, 171*c* and gear 171.

The compensator 18 will next be described Referring to Fig. 5, the rollers 19 are carried by a rocker arm 28 which is mounted upon a shaft 29, this shaft having a square end to which there is attached a lever 30. Lever 30 is pivotally connected by an adjustable connection 137 to an arm 31 which in turn is connected by adjustable connection 38 to an actuating arm 32. Arm 32 is pivoted at 33 to the frame of the machine and carries a roller 34 adapted to follow the cam 35 which is driven by shaft 36, which may be driven by the clutch member designated broadly as 48 as will be hereinafter more fully described.

The cam 35 is so shaped that at every revolution of shaft 36 the compensator will perform a complete cycle. The formation and timing of cam 35 is shown in Fig. 5 and indicated on the cam timing chart of Fig. 11 in the column headed "Compensator cam." Cam 35 imparts a rocking motion to the rocker arm 28, but in order that the portions 22 of the paper strips 16 become absolutely stationary, it is necessary that the rollers 19 on the ends of rocker arm 28 move at a uniform velocity equal to one-half of the velocity of the paper strips 16. The velocity of rollers 19 should be only one-half of the velocity of the paper strips 16 because they are looped over rollers 19 and the two legs of the loop are varied by motion of the rollers 19.

From the position of rest shown in Fig. 5, cam 35 moves in the direction of the arrow upon operation of clutch 48. The radius of the cam is constant for 60° or to the points 35*b*. A rise is provided from 35*b* to 35*c* or for 60°–200° of the cam, and a drop is provided from 35*c* to 35*a* or for 200°–270° of the cam. The central portion of the rise 35*b*, 35*c* is such that the rollers 19 are moved at a uniform velocity equal to one-half the velocity of the paper strips 16 and so that during the rotation of cams 35 from 100° to 150°, see Fig. 11, the portions 22 of paper strips 16 are held absolutely stationary. The remaining portions of rise 35*b*, 35*c* are formed so as to smooth out the operation of the compensator. From 60°–100° of the cams 35, the movement of rollers 19 is gradually accelerated to reach the necessary uniform velocity and the velocity of the paper is gradually decelerated, while from 150°–200° the movement of rollers 19 is gradually decelerated to zero and then moved in the opposite direction by drop 35*c*, 35*d*. The velocity of the paper strips 16 is gradually accelerated to normal velocity by the later portion of rise 35*b*, 35*c*, is quite rapidly accelerated by drop 35*c*, 35*d*, reaching a maximum at approximately the middle of the drop, and is then decelerated to zero acceleration by the end of said drop. Thus the velocity of the paper strips 16 is increased sufficiently above the normal velocity to move the paper in the loop in front of the compensator therethrough.

The shaper 23 is operated in timed relation with the compensator in the following manner. Shaft 36 operates an eccentric cam 37 which is connected by means of an eccentric strap 37' to the shaft 40 as best shown in Fig. 4. The shaft 40 supports a pair of cross heads 41 to which are connected four upright draw bars 42, two on each side of the machine. The draw bars 42 support a ram 43 which carries the shaping punches and dies and which is guided in its movements by the fixed pilot rods 44 upon which the bearings 45 of the ram 43 freely slide. These shaping punches and dies may be interchanged with others of any desired form.

The ram carries a plurality of punches 46 on the lower side of the head and these punches are adapted to cooperate with mating dies 47 for punching out the diamond shaped portions indicated at 5 in Fig. 3 in broken lines. The cam 35 and eccentric cam 37 are both rotated by shaft 36 and in timed relation so that the punching operation takes place while the portions 22 of paper strips 16 are stationary. This relation is shown by the relation of the "Compensator cam" and "Shapper eccentric" time charts in Fig. 11.

In order to drive shaft 36 through one revolution so that the shaft will then stop, the mechanism shown in Fig. 6 is used. Shaft 36 supports a clutch which consists of a toothed disc 50 against which a pawl 51 may be thrust by a spring 52 both the pawl 51 and the spring 52 being mounted on a disc 51' mounted on and keyed to turn with shaft 36. The pawl 51 has an extension 53 projecting into the path of an arm 54 carried by a bell crank lever 55 pivoted at 56 to the machine. The toothed disc 50 is constantly driven by the gear B (see Fig. 13) to which it may be affixed in any suitable manner. The gear B with the toothed disc 50 may idle upon shaft 36 but during the time that pawl 51 engages a tooth of disc 50 the shaft 36 is power driven.

As noted from Fig. 13 the pawls and the toothed discs are enclosed in a suitable housing.

The bell crank lever 55 is provided with a roller 57 adapted to be held in contact with cam 58 by spring 57s so that cam 58 actuates lever 55. When the cam 58 is rotated the rise thereon will trip arm 54 and will permit the pawl 51 to engage the toothed disc 50 and turn one revolution but as it finishes the revolution the tail 53 will be struck by the member 54 and moved backwardly against the pressure of spring 52, thus releasing the driving connection. This clutch is not in itself novel, being of a well known type.

It is necessary to vary the speed of the operations performed on the strip material with respect to the speed and travel of the strip material to care for variations in the distance between the printed data 2 on the wide strip of material. These variations are generally due to moisture content of the paper and sometimes amount to considerable variation from the normal in a roll, the paper shrinking or contracting in accordance more or less with the humidity.

In order to compensate for this variation in length of the paper strip, the mechanism shown in Figs. 6, 7 and 8 has been provided. As indicated in Fig. 7, power may be derived through a shaft 60' and through suitable bevelled gears 60 and 61 to a driving cone 62. Opposite cone 62 is a similar cone 63, the large ends of the two cones being in opposite directions.

Power is derived by cone 63 from cone 62 through the traveler 64, this traveler being in the form of a friction roller. The friction roller may be moved back and forth by means of the screw 65 which may be turned by a shaft 66, worm wheel 67, and worm 68, the latter being affixed to a shaft 69 on which there is a hand wheel 170.

An operator sits at the hand wheel 170 and turns this wheel back and forth as necessary to maintain the register of the shaping with the printing.

As will also be noticed from Fig. 7, cone 63 through a chain of gearing 171a, 171b, 171c and 171 which considerably reduce the speed of rotation, drives a shaft 172 which may be called the timing shaft, upon which are fixed cam 58 which we call the chopper cam and cam 173 which we call the paster cam.

Referring to Fig. 3, it will be seen that the wide strip has a black mark 8 extending across all or portions of the strip as desired. This black mark is normally in the center of the diamond shaped cut-out areas 5, and if the chopping occurs when the mark is too far from the center of the diamond areas 5 the wheel 170 is adjusted to alter the speed of the timing shaft so that the next mark will come closer to the center, it being the object of an operator to keep the mark as close to the center of the diamond cutout as possible at all times.

For applying the pasters P as indicated in Fig. 9 mechanism shown in Fig. 10 is employed. This may comprise a power driven shaft 166, which, as shown in Fig. 6, may be driven through a single revolution clutch 167 which is in all respects similar to the clutch 48 described for shaft 36, except that the roller 201 held by spring 201s against cam 173 and carried by the bell crank lever 202 which holds or releases the pawl 203 is actuated by the paster cam 173, this cam being also mounted on the power driven timing shaft 172. As was the case with clutch 48, the toothed ratchet wheel 167' is attached to turn the gear E which is constantly driven through the gears D, B and A, see Fig. 13. Gear E and ratchet wheel 167' normally idle on shaft 166 but when latch 203 engages a tooth of the ratchet wheel 167' the shaft 166 is turned because latch 203 is attached to a disc 203' which is affixed to shaft 166.

Shaft 166 is provided with a cam 67, see Fig. 10, against which a roller 68 of an arm 69 may ride, this arm being connected to a segment 70 carrying the pivoted pawl 72 adapted to engage a ratchet wheel 72' to move the member 71 in the following manner:

Shaft 75 supports a large gear 80 and this gear is of such diameter that each time the ratchet wheel 72' moves one step through the action of pawl 72 a small gear 84 is moved one complete revolution, thus turning the paster applicator suction roll 81 one revolution. The applicator 81 is fastened to the gear 79 which is of the same diameter as gear 79A so that each time the applicator suction roll moves one revolution the eccentric pad 74 is moved one revolution. Pasters are unrolled from a roll 85 between the knives 86 which are operated in timed relation with the applicator to chop off the paster which may be held by means of the suction in chamber 81 as soon as the applicator turns from the paster vacuum shield 84; this vacuum shield may be moved by a cam, not shown, the movement being indicated on the first column in Fig. 11.

When the applicator turns, the moistening roller 88 momentarily moves out and back to moisten the end of the paster as it moves toward contact with the strips 16 of paper. As the applicator 81 reaches the strips 16 the pad 74 also reaches them to form a firm base against which the paster and paper may be pressed.

The moistening roll 88 is moved by a bell crank lever 90, a connecting rod 91, a second bell crank lever 95 pivoted at 96 and actuated by roller 97 which lies in the cam path 98. This cam path is cut in a cam plate attached fixedly to the shaft 166.

The moistening roller 88 receives moisture from an intermediate roller 92 which turns in a bath 93 of water or other suitable solvent for the adhesive used.

As indicated in Fig. 6, the clutch 167, like the chopper clutch, turns one revolution and then stops and both the chopper and paster clutch must necessarily be operated in timed relation, since they are operated by cams on the same power driven shaft.

The power driven shaft 172 may turn continously during the operation of the machine, there being a starting clutch 300, having an arm 301 which may be held out of an operative position by a solenoid 304. Arm 301 forms part of a bell crank lever pivoted at 302 to the machine and having an arm 303 held by a spring 304 in a position to disconnect the clutch so that shaft 172 is not driven, the arm 303 being removable from this position to trip the clutch and thereby permit shaft 172 to be driven by the motor 59. As long as the arm is held out of the path of the clutch trip, the clutch and with it shaft 172 will continue to be driven, but as soon as the arm 301 returns to its normal position, as shown in Fig. 6, upon the clutch trip 300 reaching the arm, the clutch will no longer drive shaft 172 which carries the cams 58 and 173 will cease to turn. This movement may be accomplished by a standard type of clutch, a fragmentary section of which is shown in Fig. 14. This clutch includes a six-sided clutch member 400 which is attached to a cam member 58 and against the flat sides of which balls 401 may form a binding contact so that member 400 may be driven by the continuously rotating gear 171 when the clutch member 301 is moved from the path of the lug 300.

This is accomplished in the following manner:

Member 300 is attached to an annular link 402 from which arms 403 extend inwardly between balls. Springs 404 pressing on the pins 405 and 406 tend to rotate the arms 403 in the direction shown by the arrow in Fig. 14. Thus, when the latch member 301 rises, member 300 under the impulse of springs 404 turns to the left in Fig. 14 and the balls bind on the ends of the flat surfaces of member 400 and a driving connection is established.

When, however, member 301 projects into the path of 300 and these two members contact, the balls are again moved rearwardly into the non-binding positions in Fig. 14 in which the shaft 72 is no longer rotated. This is a well known type of ball clutch and it is thought that no further explanation is needed.

An operator sits at the wheel 170 and watches the marks 8 of Fig. 3 and notes their relation to the diamond cutouts 5. If the marks are too far advanced when the chopping action takes place to shape the ends of the respective film bands, the wheel 170 is turned in one direction to speed up the timing shaft and if the chopping action is retarded, the wheel is turned in an opposite direction.

It may happen that where a large roll of material R is running substantially constant in length, the operator does not need to make many adjustments of the hand wheel 170 after once getting the desired relation between the marks 8 and the guide on the machine.

It also may happen that it is desirable for the operator to leave the wheel 170, and in such cases the machine may be left to operate itself by releasing latch 400 and moving it to its inoperative position shown in broken lines Fig. 6.

This will free handle 245 so it may idle upon pivot 243 (as pin 244 is no longer held by latch 240) and it can be moved back and forth by solenoid 304 which may be energized by closing the switch 306. This permits the contacts 316, 318 to make a circuit through a suitable device such as electrical contacts which make contact when shaped area 5 reaches the station indicated in Fig. 2 broadly as 319. This makes a circuit through wires 320 and 321, and since the timing shaft may turn when arm 301 is held away from the clutch 300 this shaft will, by turning cams 58 and 173 cause the machine to function.

This system of operation causes the machine to operate measuring each shaping operation from the preceding punch-out portion. While this operation does not automatically make corrections for variations in the length of the strip material, it permits an operator when the material is running uniformly to move from the control wheel 170 to adjust other portions of the machine if this is necessary and it permits the machine to continue to operate while this is being done.

The operator may return at any time to manually control the punching operation with respect to the printed matter on the paper by opening switch 306, de-energizing the solenoid 304 and swinging latch 240 to an operative position shown in full lines Fig. 6 moving pin 244 by handle 405 up into engagement with the latch 240, in which position clutch 300 will permit timing shaft 172 to rotate continuously.

Since it is, of course, necessary to have the licker or paster P applied to the film backing paper in a predetermined relation with respect to the printing 2 thereon, the relation between the chopper cam and the paster cam always remains the same, but, since the speed of the drive may be changed through the friction roller 64 and the cones 62 and 63, the relation of these operations to the travel of the paper can be altered and thus these operations may be brought into proper phase with respect to the paper drive.

In order to get an accurate idea of the relation of the movement of the various parts, reference may be had to Fig. 11, wherein the relative angular relation of the parts moved through various cams is indicated. Labels on this chart bring out the function of the various cams in different angular positions.

It should be noted that the means for performing an operation on the strip material: the shaper or the paster applying mechanism together with the compensator are all driven by a constant source of power and at the same speed; but that the timing shaft, which trips the various clutches, while preferably driven by the same source of power, may vary in speed either plus or minus from the speed of the source of power. Thus while the speed of the above mentioned parts which function on the strip material is the same their time of operation with respect to the movement of the strip material may be varied to care for not only the variable condition of the strip material, but in order that film backing papers of various sizes can be cared for.

Having thus described our invention, what we claim as new and desire to secure by Letters Patent is,—

1. In a machine for preparing film backing papers from strip material, the combination with a source of power, of means actuated from the source of power for continuously moving the strip material at a uniform velocity, a compensator means including a rocker arm and rollers carried thereby for forming a pair of loops in the strip material, actuating mechanism including a cam for moving said rollers, said cam having a portion for moving said rollers at a uniform velocity and a portion for accelerating said rollers, the movement of the rollers by the first mentioned portion of said cam being adapted to hold a portion of the strip material against movement, and movement by the other portion of said cam being adapted to accelerate the movement of the strip material.

2. In a machine for preparing film backing papers from strip material, the combination with a source of power, of means actuated from the source of power for continuously moving the strip material at a uniform velocity, a compensator means including a rocker arm and rollers carried thereby for forming a pair of loops in the strip material, actuating mechanism for the compensator including an intermittently rotating cam, connections between the cam and rocker arm through which motion is transmitted from the cam to the rocker arm in two directions, the shape of the cam being such that the rocker is moved in one direction at a uniform velocity equal to substantially half the velocity of the continuously moving strip material.

3. In a machine for preparing film backing papers from strip material, the combination with a source of power, of means actuated by said source of power for continuously moving a strip of material, a shaper, mechanism for intermittently moving said shaper, a compensator for momentarily holding a portion of said strip material against movement, intermittent mechanism for moving said compensator, both of said intermittently operated mechanisms including cams mounted on a shaft driven by said source of power whereby the shaper and compensator may be operated in timed relation.

4. In a machine for preparing film backing papers from strip material, the combination with a power drive, of means associated therewith for moving a strip of material continuously, a plurality of slitters for cutting the sheet material into strips and operating on the moving strip material, a compensator for momentarily holding a portion of the strip material against movement, a shaper adapted to shape portions of the slitter strip material, connections between the compensator and a source of power and between the shaper and said source of power including intermittently operated mechanism for operating both these parts in timed relation whereby the shaping operation is performed during the moment the strip material is held against movement by the compensator.

5. In a machine for preparing film backing papers from strip material, the combination with a source of power, of a mechanism for moving strip material through the machine and driven by said source of power, a compensator for momentarily holding a portion of the strips against movement, a shaper adapted to shape portions of the strips when so held, operating mechanisms including a clutch for the compensator and actuating said shaper to operate in timed relation, a power driven trip for said clutch, and means for varying the time of power drive for the trip whereby the spacing between the shaping operations may be varied.

6. In a machine for preparing film backing papers from strip material, the combination with a source of power, rollers driven from said source of power and idle rollers over both of which strip material is continuously passed, a compensator driven from the source of power, said compensator being adapted to momentarily hold a portion of the strip material against movement, mechanism for performing an operation on the strip material while held against movement by the compensator, mechanism moved through the power drive for operating the compensator and first mentioned mechanism, and movable means for varying the time of operation of the compensator and first mentioned mechanism during the operation of the machine.

7. In a machine for preparing film backing papers from strip material, the combination with a power drive, of rollers for continuously moving a sheet of material connected to said power drive, a timing shaft, a compensator adapted to hold a portion of said sheet material against movement, and a clutch connecting said compensator to the power drive, means for driving the timing shaft through said power drive and means for altering the speed relative to the drive, and a clutch tripping mechanism associated with the timing shaft for actuating the compensator.

8. In a machine for preparing film backing papers from strip material, the combination with a power drive, of rollers for continuously moving a sheet of material connected to said power drive, a timing shaft, a compensator adapted to hold a portion of said sheet material against movement, and a clutch connecting said compensator to the power drive, means for driving the timing shaft at different speeds from the speed of the power drive, and a clutch trip associated with the timing shaft for actuating the compensator.

9. In a machine for preparing film backing papers from strip material, the combination with a power drive, of rollers for continuously moving a sheet of material connected to said power drive, a timing shaft, a compensator adapted to hold a portion of said sheet material against movement, and a clutch connecting said compensator to the power drive, means for driving the timing shaft at various speeds and independent of the speed of the power drive, and a clutch trip associated with the timing shaft to trip the clutch connectable to the power drive, whereby the clutch may drive through the power drive at a fixed speed and the trip may be operated by the timing shaft operable at different speeds from that of the power drive.

10. In a machine for preparing film backing papers from sheet material the combination with a power drive, of rollers connected to the power drive for moving the sheet material at a predetermined speed, a compensator adapted to hold a portion of said sheet material against movement and interconnected with the power drive to be intermittently driven through said drive in timed relation therewith, and a control member for varying the time of the intermittent drive of the compensator.

11. In a machine for preparing film backing papers from sheet material the combination with a power drive, of rollers connected to the power drive for moving the sheet material at a predetermined speed, a compensator adapted to hold a portion of said sheet material against movement and interconnected with the power drive to be intermittently driven through said drive in timed relation therewith, and a control member for varying the time of the intermittent drive of the compensator, said control member including a variable speed drive connecting said control member to said power drive.

12. In a machine for preparing film backing papers from sheet material the combination with a power drive, of rollers connected to the power drive for moving the sheet material at a predetermined speed, a compensator adapted to hold a portion of said sheet material against movement and interconnected with the power drive to be intermitttently driven through said drive in timed relation therewith, and a control member for varying the time of the intermittent drive of the compensator, said control member having a variable speed connection with the power drive, and a regulating device for adjusting the variable speed drive.

13. In a machine for preparing film backing papers from sheet material the combination with a power drive, of rollers connected to the power drive for moving the sheet material at a predetermined speed, a compensator adapted to hold a portion of said sheet material against movement and interconnected with the power drive to be intermittently driven through said drive in timed relation therewith, and a control member for varying the time of the intermittent drive of the compensator, said control member having a variable speed connection with the power drive, and a regulating device for adjusting the variable speed drive, the regulating device including a movable adjusting member adapted to be moved in two directions to increase and decrease the speed thereof.

14. In a machine for preparing film backing papers from sheet material the combination with a power drive, of rollers connected to the power drive for moving the sheet material at a predetermined speed, a compensator adapted to hold a portion of said sheet material against movement and interconnected with the power drive to be intermittently driven through said drive in timed relation therewith, and a control member for varying the time of the intermittent drive of the compensator, said control member having a variable speed connection with the power drive, and a regulating device for adjusting the variable speed drive, said regulating device including a hand wheel which may be turned to increase and decrease the speed of the variable speed device.

15. In a machine for preparing film backing papers from sheet material, the combination with a power drive for constantly moving sheet material, of a compensator movable through a fixed path for momentarily holding a portion of said sheet material against movement, a shaper movably mounted to move through a fixed path, connections between the compensator, shaper and power drive including a clutch, a clutch trip, and a regulating device for varying the time of operation of the clutch trip including a power driven shaft and mechanism for varying the speed of the shaft.

16. In a machine for preparing film backing papers from printed strip material, the combination with a power drive and an advancing means for said strip material driven by said power drive, of a compensator means for holding a portion of said strip material stationary, a mechanism for performing an operation on said strip material, a control means for actuating said compensator means and said mechanism in timed relation to each other, and a change speed device between said power drive and said control means, and adapted to be adjusted manually for varying the timed relation between said advancing means and said control means.

17. In a machine for preparing film backing papers from printed strip material, the combination with a power drive and an advancing means for said strip material driven by said power drive, of a compensator means for holding a portion of said strip material stationary, a punching means for removing portions of said strip material, a control means for actuating said compensator means and said punching means which operates while the compensator means holds a portion of the strip material stationary, and a change speed device between said power drive and said control means, and adapted to be adjusted manually to vary the timing relation between said advancing means and said control means.

Signed at Rochester, New York, this 13th day of August, 1929.

JOHN G. JONES.
HAYWOOD G. DEWEY.